(12) United States Patent
Wang et al.

(10) Patent No.: US 12,189,148 B2
(45) Date of Patent: Jan. 7, 2025

(54) PHOTO-ALIGNMENT DEVICE AND PHOTO-ALIGNMENT METHOD

(71) Applicants: Wuhan BOE Optoelectronics Technology Co., Ltd., Wuhan (CN); BOE TECHNOLOGY GROUP CO., LTD., Beijing (CN)

(72) Inventors: Xiaofeng Wang, Beijing (CN); Yanping Hong, Beijing (CN); Wenhao Wang, Beijing (CN)

(73) Assignees: WUHAN BOE OPTOELECTRONICS TECHNOLOGY CO., LTD., Hubei (CN); BOE TECHNOLOGY GROUP CO., LTD., Beijing (CN)

( * ) Notice: Subject to any disclaimer, the term of this patent is extended or adjusted under 35 U.S.C. 154(b) by 278 days.

(21) Appl. No.: 17/638,880

(22) PCT Filed: Apr. 9, 2021

(86) PCT No.: PCT/CN2021/086285
§ 371 (c)(1),
(2) Date: Feb. 28, 2022

(87) PCT Pub. No.: WO2021/238449
PCT Pub. Date: Dec. 2, 2021

(65) Prior Publication Data
US 2022/0308270 A1    Sep. 29, 2022

(30) Foreign Application Priority Data
May 26, 2020   (CN) .......................... 202010455841.7

(51) Int. Cl.
*G02B 5/00*  (2006.01)
*G01B 11/27*  (2006.01)
(Continued)

(52) U.S. Cl.
CPC ............ *G02B 5/005* (2013.01); *G01B 11/272* (2013.01); *G02B 27/286* (2013.01); *G02F 1/133788* (2013.01)

(58) Field of Classification Search
CPC .... G01B 11/272; G02B 27/286; G02B 5/005; G02F 1/133788; G02F 1/1303
(Continued)

(56) References Cited

U.S. PATENT DOCUMENTS

| 10,527,947 B2 | 1/2020 | Dai et al. |
| 2019/0204754 A1 | 7/2019 | Dai et al. |

FOREIGN PATENT DOCUMENTS

| CN | 102681258 A | 9/2012 |
| CN | 103672625 A | 3/2014 |

(Continued)

OTHER PUBLICATIONS

International Search Report and Written Opinion for International Application No. PCT/CN2021/086285 mailed Jul. 15, 2021.
(Continued)

*Primary Examiner* — Tri T Ton
(74) *Attorney, Agent, or Firm* — Perilla Knox & Hildebrandt LLP; Kenneth A. Knox

(57) ABSTRACT

The present disclosure relates to the field of display technology. Provided are a photo alignment device and a photo-alignment method. The photo alignment device comprises a worktable; at least two light source modules arranged along a first direction; at least two light-shielding modules arranged along the first direction; and at least two light-polarizing modules arranged along the first direction, wherein the light-polarizing modules at least comprises a first light-polarizing module and a second light-polarizing module whose light-polarizing directions are different, the light-shielding modules comprise at least two light-shielding
(Continued)

plates that are movable, the light source modules, the light-polarizing modules and the light-shielding modules are able to form a plurality of working modules, and one of the working modules comprises one of the light-polarizing modules, one of the light source modules and one of the light-shielding module The photo-alignment device can improve the efficiency of manufacturing photo alignment films.

18 Claims, 16 Drawing Sheets

(51) Int. Cl.
*G02B 27/28* (2006.01)
*G02F 1/1337* (2006.01)

(58) Field of Classification Search
USPC .......................................................... 356/138
See application file for complete search history.

(56) References Cited

FOREIGN PATENT DOCUMENTS

| | | | | |
|---|---|---|---|---|
| CN | 104267542 | A | | 1/2015 |
| CN | 105892156 | A | | 8/2016 |
| CN | 205620651 | U | | 10/2016 |
| CN | 106338892 | A | | 1/2017 |
| CN | 106444101 | A | | 2/2017 |
| CN | 104267542 | B | * | 6/2017 ....... G02F 1/133753 |
| CN | 107255890 | A | | 10/2017 |
| CN | 107664877 | A | * | 2/2018 |
| CN | 108139619 | A | | 6/2018 |
| CN | 108167756 | A | | 6/2018 |
| CN | 108604030 | A | | 9/2018 |
| CN | 208186217 | U | | 12/2018 |
| CN | 109358455 | A | | 2/2019 |
| CN | 109459891 | A | | 3/2019 |
| CN | 110858042 | A | | 3/2020 |
| CN | 110888267 | A | | 3/2020 |
| CN | 111552124 | A | | 8/2020 |
| CN | 110888267 | B | | 12/2020 |
| EP | 1986222 | A1 | | 10/2008 |
| JP | 2017032957 | A | | 2/2017 |
| JP | 2017083546 | A | | 5/2017 |
| JP | 2017151405 | A | | 8/2017 |
| JP | 2017215613 | A | | 12/2017 |
| JP | 6660144 | B2 | | 3/2020 |
| KR | 20140148338 | A | | 12/2014 |
| KR | 20170003045 | A | | 1/2017 |
| KR | 20170015799 | A | | 2/2017 |
| KR | 20170017707 | A | | 2/2017 |
| KR | 20180073556 | A | | 7/2018 |
| KR | 20180114021 | A | | 10/2018 |
| TW | 201721259 | A | | 6/2017 |
| TW | 201725407 | A | | 7/2017 |
| TW | 201734560 | A | | 10/2017 |
| TW | 2018017952 | A | | 2/2018 |
| WO | 2017068962 | A1 | | 4/2017 |

OTHER PUBLICATIONS

First Office Action for CN Patent Application No. 202010455841.7 mailed Jul. 5, 2021.
Second Office Action for CN Patent Application No. 202010455841.7 mailed Mar. 2, 2022.
Third Office Action for CN Patent Application No. 202010455841.7 mailed Jun. 20, 2022.
Fan, Z. & Zheng, Y. & Liu, Y. & Yang, L. & Gao, P. (2012). Preparation of stressed liquid crystal scattering polarizer. Guangxue Jishu/Optical Technique. 38. 473-476.
Sakamoto K, Usami K, Miki K. Light Exposure Dependence of Molecular Orientation of Glassy Polyfluorene Layers Formed on Photo-aligned Polyimide Films. Colloids Surf B Biointerfaces. Apr. 15, 2007;56(1-2):260-4. doi: 10.1016/j.colsurfb.2006.11.033. Epub Dec. 5, 2006. PMID: 17208420.

* cited by examiner

PHOTO-ALIGNMENT DEVICE AND PHOTO-ALIGNMENT METHOD

CROSS REFERENCE TO RELATED APPLICATION

The present disclosure is a national phase application under 35 U.S.C. § 371 of International Application No. PCT/CN2021/086285 filed on Apr. 9, 2021, which claims the benefit of and priority to Chinese Patent Application No. 202010455841.7 entitled "OPTICAL ALIGNMENT APPARATUS AND METHOD" filed on May 26, 2020, the entire contents of both of which are incorporated herein by reference in their entirety.

TECHNICAL FIELD

The present disclosure relates to the field of display technology and, in particular, to a photo-alignment device and a photo-alignment method.

BACKGROUND

A liquid crystal panel includes an array substrate and a color light-filtering sheet substrate that are oppositely assembled by a frame sealant, and liquid crystal located between the array substrate and the color light-filtering sheet substrate. Each of the array substrate and the color light-filtering sheet substrate is provided with an alignment film on the side close to the liquid crystal. The alignment film has anisotropy and can align the liquid crystal, so that liquid crystal molecules are regularly arranged along a fixed direction. During production, the liquid crystal panel, as a cut unit, is cut from an entire piece of liquid crystal panels, and a photo-alignment process of the array substrate and the color light-filtering sheet substrate (hereinafter referred to as a substrate) is performed for an entire piece of substrates.

However, in the photo-alignment process, existing photo-alignment equipment cannot simultaneously expose regions with different alignment directions on the substrate. For example, for a substrate arranged with regions with two different alignment directions, two exposure treatments are required, that is, the regions of one alignment direction on the substrate are exposed first, then the substrate is taken out from the equipment, and rotated according to a required direction, and then reentered the equipment to expose the regions of another alignment direction. Not only that, if the regions with different alignment directions on the substrate are alternatively arranged, a light-shielding plate is needed to shield a part of the substrate during the exposure process. These increase tact time of photo-alignment processing time and reduce production efficiency.

The above information disclosed in this background is only for enhancement of understanding of the background of the disclosure and therefore it may contain information that does not form the prior art that is already known to a person of ordinary skill in the art.

SUMMARY

The present disclosure adopts the following technical solutions:

According to a first aspect of the present disclosure, there is provided a photo-alignment device, including:
 a worktable, having a carrying surface for carrying a substrate;
 at least two light source modules, arranged along a first direction;
 at least two light-polarizing modules, arranged along the first direction, wherein the light-polarizing modules at least includes a first light-polarizing module whose light-polarizing direction is a second direction and a second light-polarizing module whose light-polarizing direction is a third direction, and the second direction is different from the third direction; and
 at least two light-shielding modules, arranged along the first direction, wherein any one of the light-shielding modules include at least two light-shielding plates that are movable,
 wherein the light source modules, the light-polarizing modules and the light-shielding modules are able to form a plurality of working modules, any one of the working modules includes one of the light-polarizing modules, one of the light source modules and one of the light-shielding module, the light source module is arranged on a side of the light-polarizing module distal to the worktable, the light-shielding module is able to be configured to shield at most a part of light emitted by the light source module, and in a state where the light-shielding plate does not shield the light of the light source module, the light emitted by the light source module is able to pass through the light-polarizing module to form polarized light to be irradiated to the worktable.

In an exemplary embodiment of the present disclosure, the light source module includes:
 a plurality of ultraviolet light sources arranged adjacently in sequence along a fourth direction, wherein the fourth direction is parallel to a plane where the carrying surface is located, and is not parallel to the first direction.

In an exemplary embodiment of the present disclosure, the photo-alignment device includes a light source control circuit for controlling the respective ultraviolet light sources to emit light separately.

In an exemplary embodiment of the present disclosure, the light-shielding plate is able to move along the fourth direction, a size of the light-shielding plate in the fourth direction is not smaller than a size of the ultraviolet light source in the fourth direction.

In an exemplary embodiment of the present disclosure, in the fourth direction, the light-shielding plate has two light-limiting edges arranged oppositely, the light-limiting edge is arranged along the first direction, and a size of the light-limiting edge in the first direction is not smaller than a size of the light source module in the first direction.

In an exemplary embodiment of the present disclosure, a number of the first light-polarizing modules is the same as a number of the second light-polarizing modules, both a number of the light source modules and a number of the light-shielding modules are the same as the number of the light-polarizing modules, and
 the respective light-polarizing modules, the respective light source modules and the respective light-shielding modules are arranged in a one-to-one correspondence to form the respective working modules.

In an exemplary embodiment of the present disclosure, a number of the light source modules is less than a number of the light-polarizing modules, and a number of the light-shielding modules is not less than the number of the light source modules, and the light source module is able to move along the first direction, to get along with different ones of the light-polarizing modules to form different ones of the working modules.

In an exemplary embodiment of the present disclosure, a number of the first light-polarizing modules is at least two, and a number of the second light-polarizing modules is the same as the number of the first light-polarizing modules, and the number of the light source modules is the same as the number of the first light-polarizing modules.

In an exemplary embodiment of the present disclosure, a number of the first light-polarizing modules is twice a number of the second light-polarizing modules, and the number of the light source modules is the same as the number of the first light-polarizing modules.

According to a second aspect of the present disclosure, there is provided a photo-alignment method, applied to the above photo-alignment devices, and including:

obtaining a photo-alignment pattern of the substrate, wherein the photo-alignment pattern includes at least one type of first patterns aligned along the second direction and second patterns aligned along the third direction;

determining a first range of the first patterns in a direction perpendicular to the first direction, and determining a second range of the second patterns in a direction perpendicular to the first direction;

configuring the respective working modules, to adjust working regions of the respective working modules, wherein the working region of the working module is a region of the polarized light that the working module irradiates onto the worktable, wherein a range of the working region of the working module having the first light-polarizing module in the direction perpendicular to the first direction is the same as the first range, and a range of the working region of the working module having the second light-polarizing module in the direction perpendicular to the first direction is the same as the second range; and controlling the substrate to move along the first direction and pass through the worktable.

BRIEF DESCRIPTION OF THE DRAWINGS

The above and other features and advantages of the present disclosure will become more apparent from the detailed description of example embodiments thereof with reference to the accompanying drawings.

DETAILED DESCRIPTION

Figure 1:
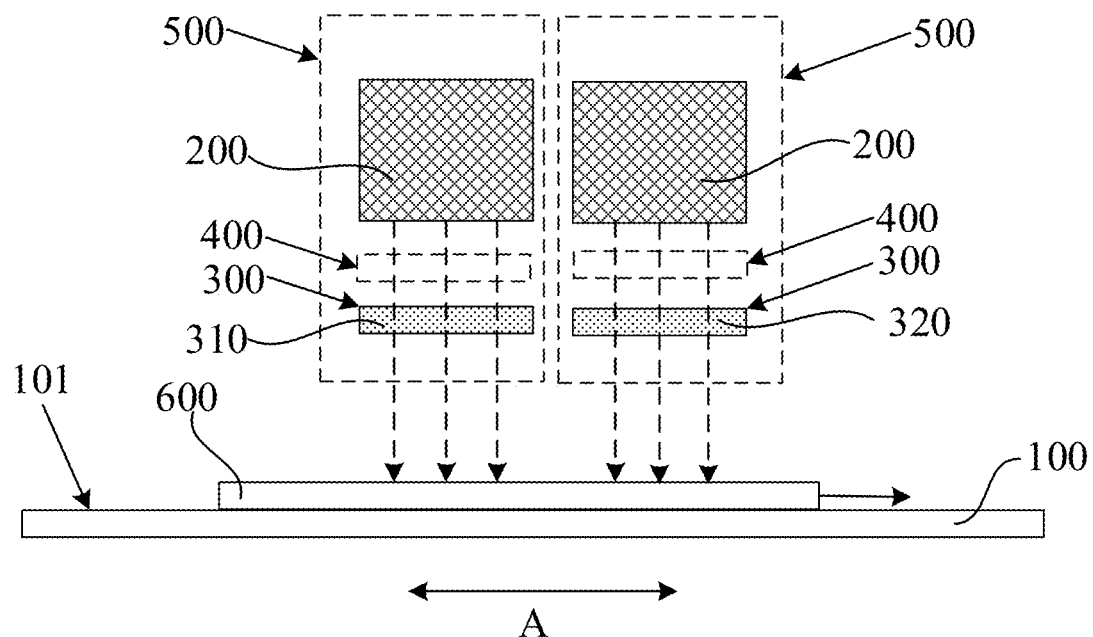
FIG. 1 is a schematic structural diagram of a side view of a photo-alignment device according to an embodiment of the present disclosure.

Example embodiments will now be described more fully with reference to the accompanying drawings. Example embodiments, however, can be embodied in various forms and should not be construed as limited to the examples set forth herein; rather, these embodiments are provided so that this disclosure will be thorough and complete, and will fully convey the concept of example embodiments to those skilled in the art. The described features, structures, or characteristics may be combined in any suitable manner in one or more embodiments. In the following description, numerous specific details are provided in order to give a thorough understanding of the embodiments of the present disclosure.

In the drawings, the thickness of regions and layers may be exaggerated for clarity. The same reference signs in the drawings denote the same or similar structures, and thus their detailed descriptions will be omitted.

The described features, structures, or characteristics may be combined in any suitable manner in one or more embodiments. In the following description, numerous specific details are provided in order to give a thorough understanding of the embodiments of the present disclosure. However, one skilled in the art will appreciate that the technical solutions of the present disclosure may be practiced without one or more of the specific details, or other methods, components, materials, etc., may be employed. In other instances, well-known structures, materials, or operations are not shown or described in detail to avoid obscuring the main technical idea of the present disclosure.

When a certain structure is "on" other structures, it may mean that the certain structure is integrally formed on the said other structures, or that the certain structure is "directly" arranged on the said other structures, or that the certain structure is "indirectly" arranged on the said other structures through another structure.

The terms "a", "an", and "the" are used to indicate the presence of one or more elements/components/etc.; the terms "including" and "having" are used to indicate an open-ended inclusive meaning and refer to that additional elements/components/etc., may be present in addition to the listed elements/components/etc. The terms "first" and "second" etc., are used only as labels and not as limitations on the number of objects.

As shown in FIG. 1, the present disclosure provides a photo-alignment device for producing a photo-alignment film on a substrate 600. The photo-alignment device includes a worktable 100, a light source module 200, a light-polarizing module 300, and a light-shielding module 400.

The worktable 100 has a carrying surface 101 for carrying the substrate 600; the number of light source modules 200 is at least two, and the respective light source modules 200 are arranged along a first direction A; the number of light-polarizing modules 300 is at least two, and the respective light-polarizing module 300 are arranged along the first direction A; the light-polarizing module 300 at least includes a first light-polarizing module 310 whose light-polarizing direction is a second direction and a second light-polarizing module 320 whose light-polarizing direction is a third direction, and the second direction is different from the third direction; the number of light-shielding modules 400 is at least two, and the respective light-shielding module 400 are arranged along the first direction A, and any one of the light-shielding modules 400 includes at least two light-shielding plates 410 that are movable (not shown in FIG. 1);
the light source modules 200, the light-polarizing modules 300 and the light-shielding modules 400 can form a plurality of working modules 500; any one of the working modules 500 includes one light-polarizing module 300, one light source module 200 and one light-shielding module 400, the light source module 200 is disposed on a side of the light-polarizing module 300 distal to the worktable 100, and the light-shielding module 400 can be configured to shield at most a part of light emitted by the light source module 200, and in a state where the light-shielding plate 410 does not shield the light of the light source module 200, the light emitted by the light source module 200 can pass through the light-polarizing module 300 to form polarized light and be irradiated to the worktable 100.

The optical-alignment device provided by the present disclosure can be configured with different working modules 500, such as adjusting the types of the light-polarizing modules 300 in the working module 500, adjusting whether the light source modules 200 in the working module 500 work or not, adjusting the positions of the light-shielding plates 410 in the working module 500, and the like, can realize the formation of photo-alignment films with different alignment directions in different regions of the substrate 600 in one exposure process, thereby reducing the tact time for producing photo-alignment films and improving efficiency for producing the photo-alignment films. Not only that, by configuring different working modules 500, the photo-alignment device is suitable for producing photo-alignment films with a single alignment direction, which improves the versatility of the photo-alignment device.

Hereinafter, the structure, principle and effect of the photo-alignment device provided by the present disclosure will be further explained and described with reference to the accompanying drawings.

As shown in FIG. 1, the photo-alignment device provided by the present disclosure is provided with the worktable 100, and the worktable 100 has a carrying surface 101 for carrying the substrate 600. During the photo-alignment process, the substrate 600 can be placed on the carrying surface 101, and a surface of the substrate 600 distal to the carrying surface 101 has an organic film layer to form a photo-alignment film, and the organic film layer may be such as a polyimide film containing photosensitizer. The substrate 600 can move along the first direction A and pass through the worktable 100. During the movement of the substrate 600, the working module 500 of the photo-alignment device can irradiate polarized light in a direction toward the worktable 100, such that the organic film layer on the substrate 600 is exposed to light during the movement, thereby forming a corresponding photo-alignment film. In other words, during the photo-alignment process, the substrate 600 can move along the first direction A and exposed during the movement, and the substrate 600 does not need to be stopped and aligned on the worktable 100 before exposure is performed. This can further simplify the photo-alignment process and improve fabrication efficiency of photo-alignment films.

As an embodiment of the present disclosure, the substrate 600 can move at a constant speed along the first direction A.

Optionally, under a circumstance where a working state of the working module 500 remains unchanged, for example, under a circumstance where an illumination intensity toward the worktable 100 and an illumination width along the first direction A of the working module 500 remain unchanged, by adjusting the speed of the substrate 600 passing through the worktable 100, an intensity that the organic film layer is exposed can be adjusted. It can be understood that when the speed of the substrate 600 for passing through is increased, the time that a specific position of the organic film layer is exposed is shorten and the intensity of exposure is lower; and when the speed of the substrate 600 for passing through is decreased, the time that the specific position of the organic film layer is exposed is lengthen and the intensity of exposure is higher.

Figure 2:
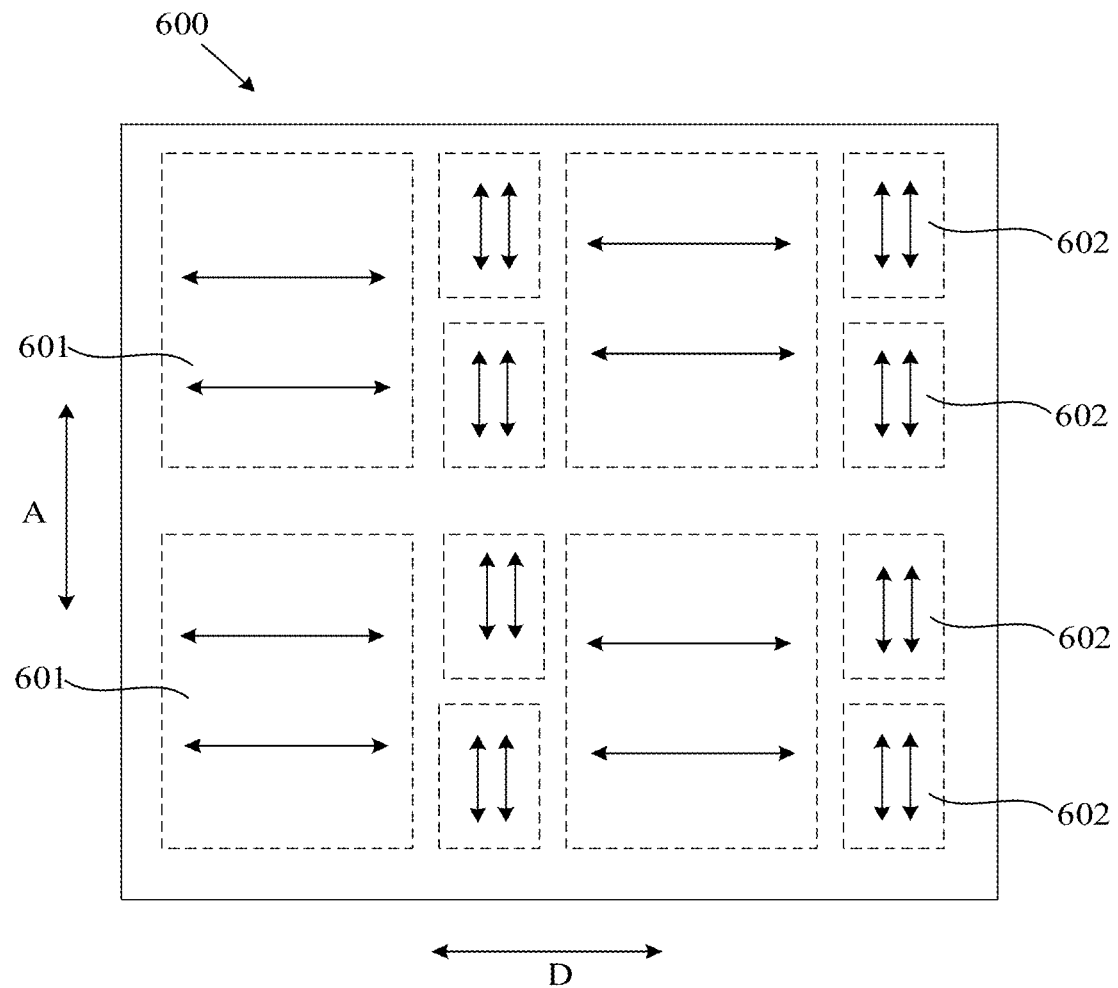
FIG. 2 is a schematic diagram of a photo-alignment pattern of a substrate according to an embodiment of the present disclosure.

Before the photo-alignment process, a photo-alignment pattern of the substrate 600 can be obtained first, and required working modules 500 can be configured according to the photo-alignment pattern of the substrate 600. The photo-alignment pattern of the substrate 600 refers to a distribution pattern of regions in respective alignment directions in the photo-alignment film to be formed on the substrate 600. As shown in FIG. 2, in an MMG (Multi Model Group, or panel cover cut) product, the photo-alignment film has different alignment directions in different regions. For example, in a range of some regions, the alignment direction is the second direction, and in a range of other regions, the alignment direction is the third direction, then the distribution pattern of the regions whose alignment direction is the second direction is first patterns 601 of the substrate 600, and the distribution pattern of the regions whose alignment direction is the third direction is second patterns 602 of the substrate 600. The pattern 601 and the second pattern 602 constitute the photo-alignment pattern of the substrate 600.

Figure 3:
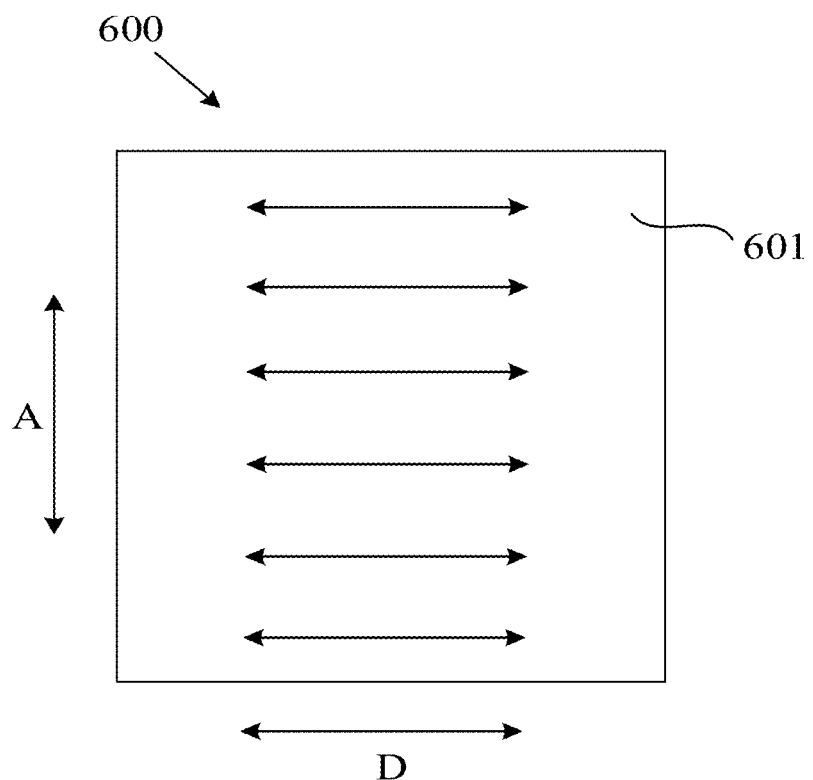
FIG. 3 is a schematic diagram of a photo-alignment pattern of a substrate according to an embodiment of the present disclosure.
Figure 4:
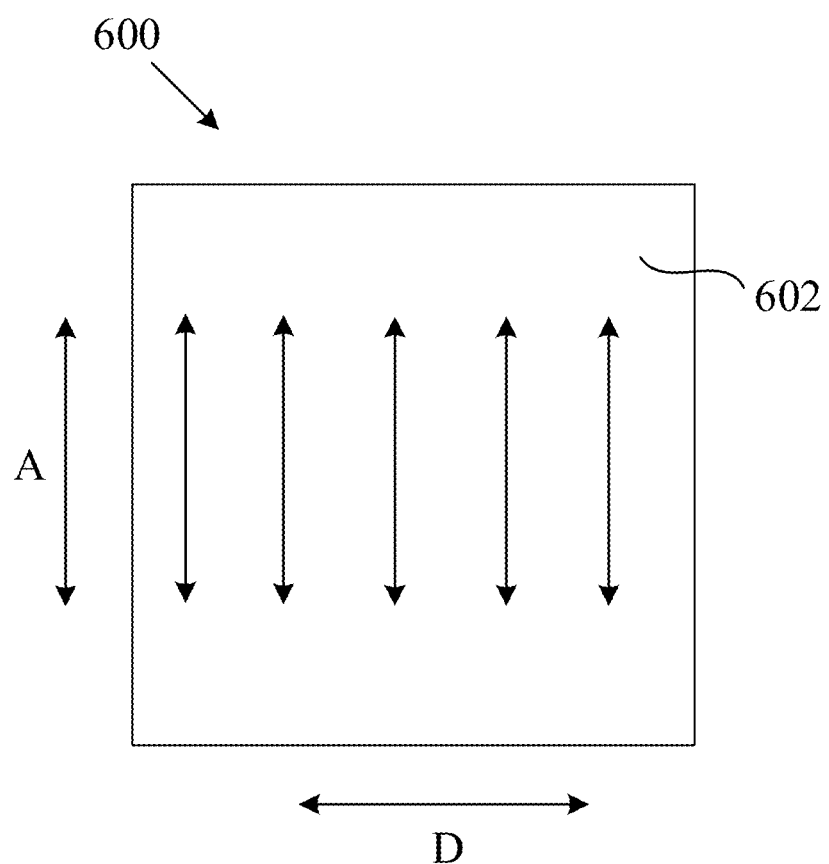
FIG. 4 is a schematic diagram of a photo-alignment pattern of a substrate according to an embodiment of the present disclosure.

As shown in FIGS. 3 and 4, if the photo-alignment film to be formed on the substrate 600 has a single alignment direction, for example, the alignment direction of the photo-alignment film is the second direction (shown in FIG. 3) or the third direction (shown in FIG. 4), the photo-alignment pattern of the substrate 600 may be the entire substrate 600. In other words, as shown in FIG. 3, if the alignment direction of the photo-alignment film on the entire substrate is the second direction, the first patterns 601 of the substrate 600 are the photo-alignment pattern of the substrate 600. As shown in FIG. 4, if the alignment direction of the photo-alignment film on the entire substrate is the third direction, the second patterns 602 of the substrate 600 are the photo-alignment pattern of the substrate 600. It can be understood that, if the photo-alignment film to be formed further has regions with other alignment directions, the photo-alignment pattern of the substrate 600 further includes the distribution patterns of these regions with the said other alignment directions.

As shown in FIG. 2, when the photo-alignment pattern of the substrate 600 includes a plurality of different patterns and the alignment directions of the different patterns are different, the different patterns are arranged at intervals along a direction perpendicular to the first direction A. In other words, along a straight line in the first direction A, the photo-alignment film to be formed has a single alignment direction.

According to the photo-alignment pattern of the substrate 600, a range of regions of any one of the alignment directions on the substrate 600 in the direction perpendicular to the first direction A can be obtained. For example, if the photo-alignment pattern includes the first patterns 601 aligned in the second direction and the second patterns 602 aligned in the third direction, a first range of the first patterns 601 in the direction perpendicular to the first direction A can be determined, and a second range of the second patterns 602 in the direction perpendicular to the first direction A can be determined.

After the above, the respective working modules 500 can be configured to adjust working regions of the respective working modules 500, wherein the working region of the working module 500 is a region of the polarized light that the working module 500 irradiates onto the worktable 100. A range of the working region of the working module 500 with the first light-polarizing module 310 in the direction perpendicular to the first direction A is the same as the first range; and a range of the working region of the working module 500 with the second light-polarizing module 320 in the direction perpendicular to the first direction A is the same as the second range.

Figure 5:
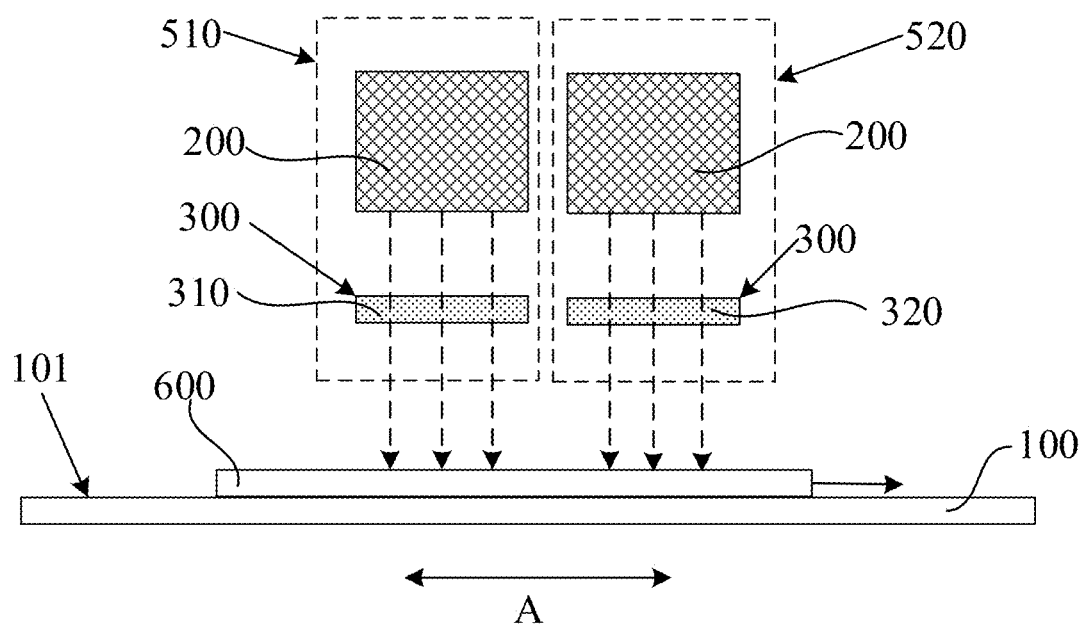
FIG. 5 is a schematic structural diagram of a side view of a configuration state of a photo-alignment device in according to an embodiment of the present disclosure.

Exemplarily, in one embodiment of the present disclosure, the photo-alignment device has two light source modules 200, two light-shielding modules 400, one first light-polarizing module 310 and one second light-polarizing module 320. As shown in FIG. 2, the photo-alignment pattern of the substrate 600 includes first patterns 601 aligned in the second direction and second patterns 602 aligned in the third direction. The first working module 510 and the second working module 520 can be configured in the photo-alignment device according to the methods shown in FIGS. 5 to 8, wherein the first working module 510 includes one first light-polarizing module 310, one light source module 200 and one light-shielding module 400, and the second working module 520 includes one second light-polarizing module 320, one light source module 200 and one light-shielding module 400. FIG. 5 is a side view of the photo-alignment device along the first direction A, and the light-shielding module 400 is not shown in FIG. 5. Referring to FIG. 5, the substrate 600 passes through the worktable 101 along the first direction, such that the substrate 600 passes below the first working module 510 and the second working module 520 in sequence, and is exposed by the polarized light of the first working module 510 when passing below the first working module 510, and is exposed by the polarized light of the second working module 520 when passing below the second working module 520.

Figure 6:
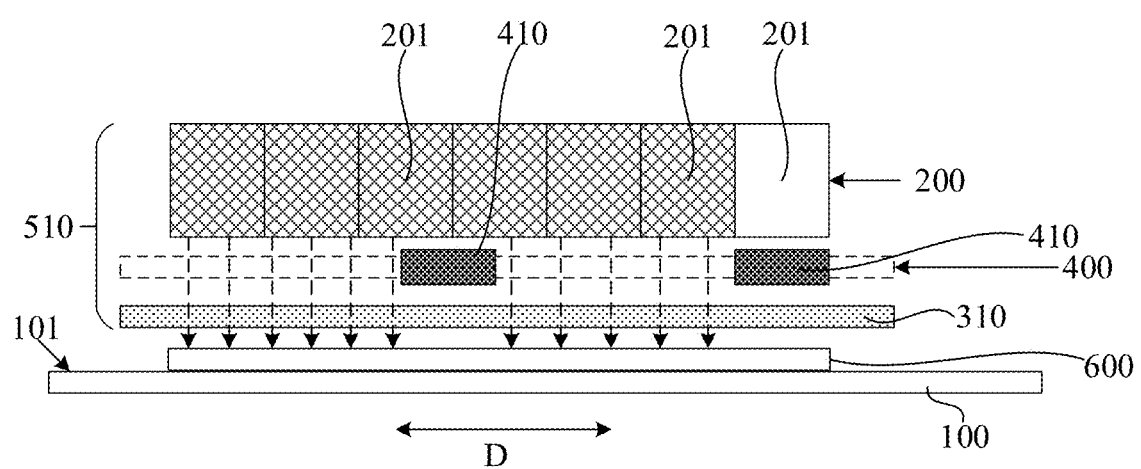
FIG. 6 is a schematic structural diagram of a side view of a first working module according to an embodiment of the present disclosure.

FIG. 6 is a side view of the first working module 510 in the direction perpendicular to the first direction A, wherein dashed lines with arrows represent the light irradiated by the light source module 200 onto the substrate 600, and these light passes through the first light-polarizing module 310 and then are converted into polarized light. Parts of regions of the light source module 200 in FIG. 6 are filled with grid lines, indicating that these parts need to emit light. Parts of regions of the light source module 200 in FIG. 6 are not filled with any grid line, indicating that these parts do not emit light, so there is no need to shield these parts with the light-shielding plate 410. These parts can be made emit light, and the light-shielding plate 410 can be adopted to shield these parts as well. Referring to FIG. 6, by adjusting the position of the light-shielding plate 410 of the light-shielding module 400 and a working state of the light source module 200, the first working module 510 can irradiate polarized light toward the worktable 100 (represented by dashed lines with arrows in FIG. 6), and the region irradiated by polarized light is a first working region. A position of the first working region in the direction perpendicular to the first direction A is the same as a position of the first pattern 601 in the direction perpendicular to the first direction A.

Figure 7:
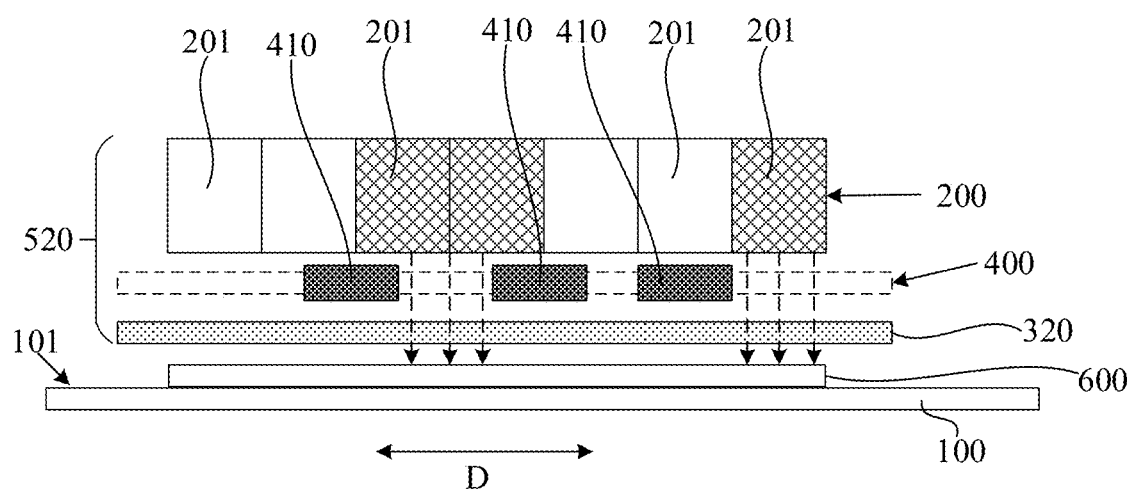
FIG. 7 is a schematic structural diagram of a side view of a second working module according to an embodiment of the present disclosure.

FIG. 7 is a side view of the second working module 520 in the direction perpendicular to the first direction A, wherein the dashed lines with arrows represent the light irradiated by the light source module 200 onto the substrate 600, and these light passes through the second light-polarizing module 320 and then are converted into polarized light. Parts of regions of the light source module 200 in FIG. 7 are filled with grid lines, indicating that these parts need to emit light. Parts of regions of the light source module 200 in FIG. 7 are not filled with any grid line, indicating that these parts do not emit light, so there is no need to shield these parts with the light-shielding plate 410. These parts can be made emit light, and the light-shielding plate 410 can be adopted to shield these parts as well. Referring to FIG. 7, by adjusting the position of the light-shielding plate 410 of the light-shielding module 400 and a working state of the light source module 200, the second working module 520 can irradiate polarized light toward the worktable 100 (represented by dashed lines with arrows in FIG. 7), and the region irradiated by polarized light is a second working region. A position of the second working region in the direction perpendicular to the first direction A is the same as a position of the second pattern 602 in the direction perpendicular to the first direction A.

Figure 8:
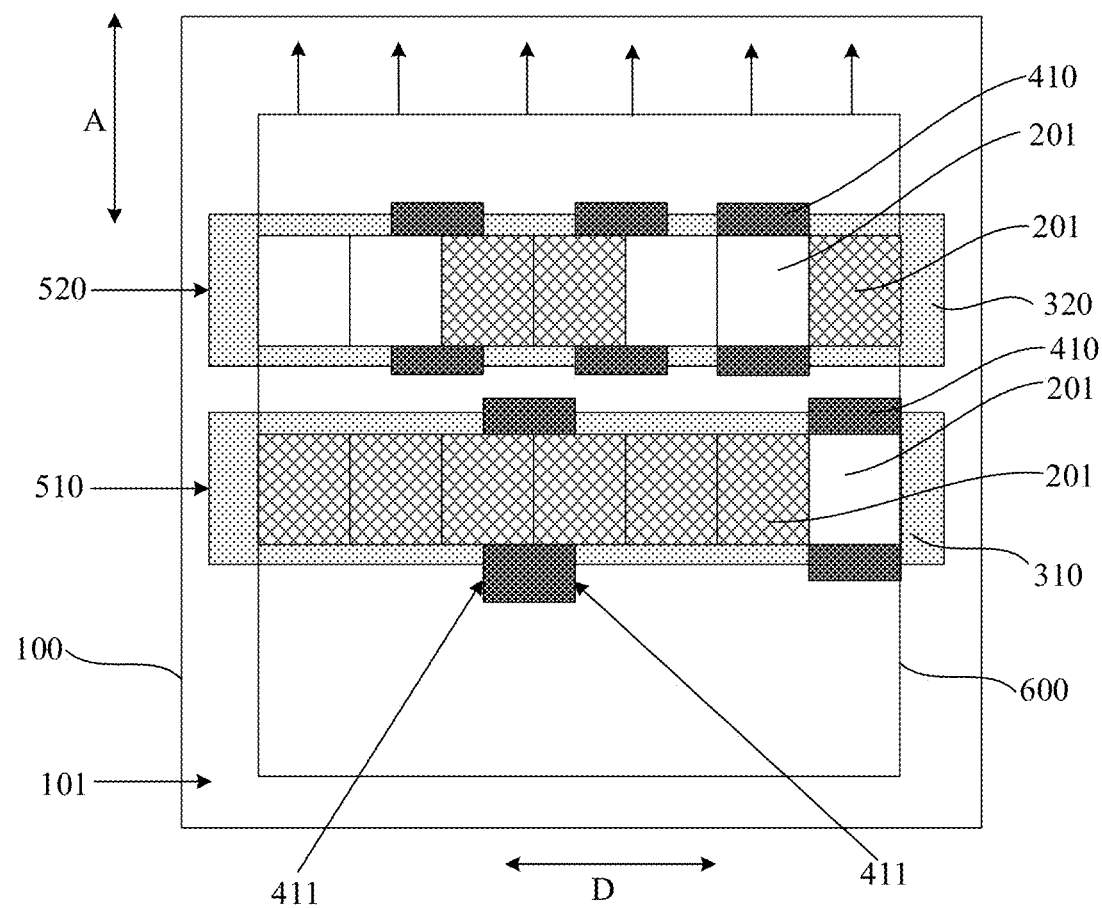
FIG. 8 is a schematic structural diagram of a top view of a configuration state of a photo-alignment device in according to an embodiment of the present disclosure.

FIG. 8 is a top view of the photo-alignment device. In order to show a layer order among the light source module 200, the light-shielding module 400 and the light-polarizing module 300, in FIG. 8, a range of the light-polarizing module 300 is schematically made larger than that of the light source module 200, and a width of the light-shielding module 400 is schematically made larger than that of the light source module 200, but these do not constitute a limitation on dimensions of the light source module 200, the light-shielding module 400 and the light-polarizing module 300. Referring to FIG. 8, the substrate 600 passes through the worktable 101 along the first direction, such that the substrate 600 passes below the first working module 510 and the second working module 520 in sequence, and is exposed by the polarized light of the first working module 510 when passing below the first working module 510, and is exposed by the polarized light of the second working module 520 when passing below the second working module 520.

In the above way, during the photo-alignment process, the first working module 510 irradiates the polarized light to the first working region, and the second working module 520 irradiates the polarized light to the second working region. The substrate 600 moves along the first direction A and passes through the worktable 100, parts of regions of the substrate 600 are exposed by the polarized light of the first working region and form parts where the alignment direction of the photo-alignment film is the second direction; another parts of regions of the substrate 600 are exposed by the polarized light of the second working region and form parts where the alignment direction of the photo-alignment film is the third direction. As such, via the photo-alignment device of the present disclosure, the substrate 600 can pass through the worktable 100 along the first direction A and form a required photo-alignment film.

Figure 9:
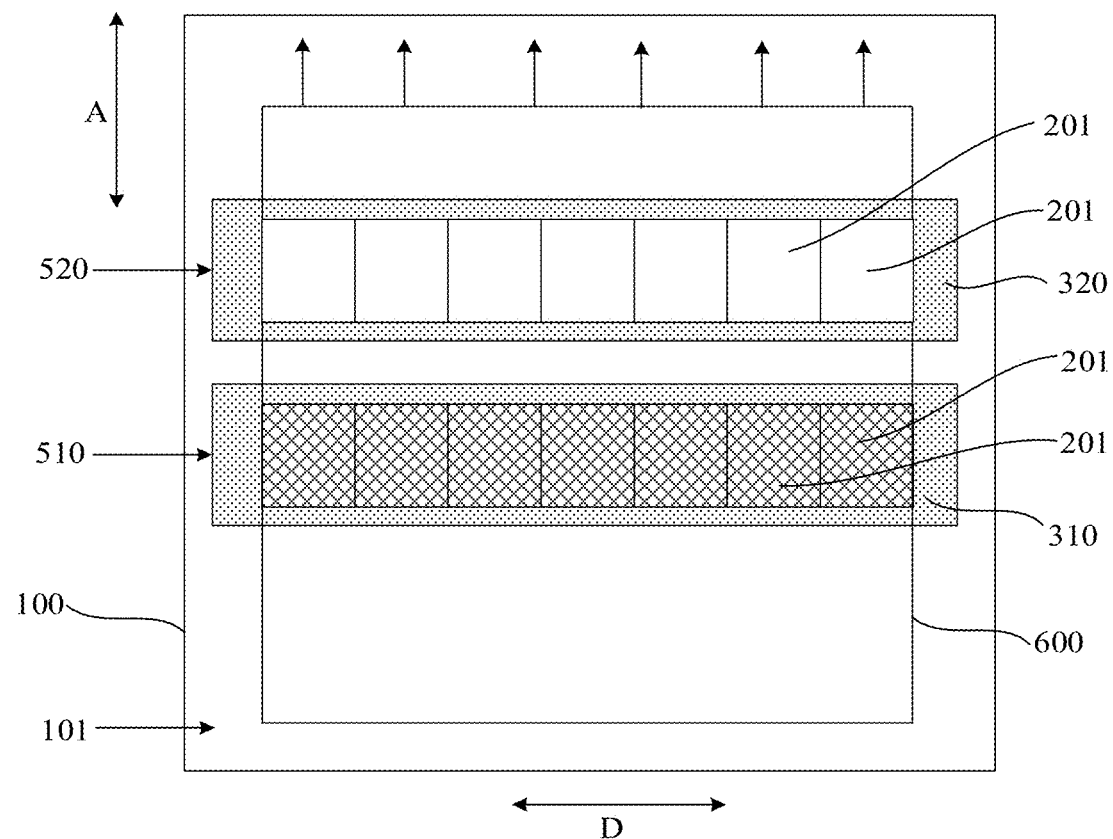
FIG. 9 is a schematic structural diagram of a top view of a configuration state of a photo-alignment device in according to an embodiment of the present disclosure.
Figure 10:
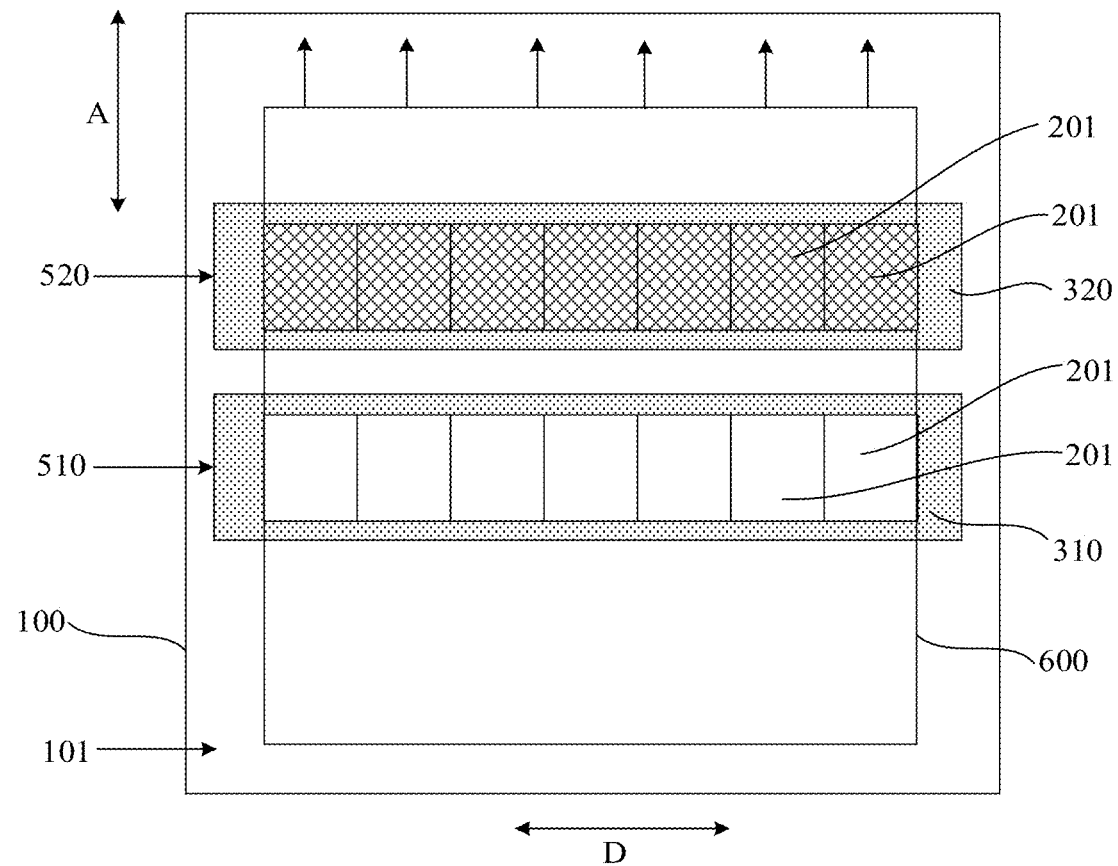
FIG. 10 is a schematic structural diagram of a top view of a configuration state of a photo-alignment device in according to an embodiment of the present disclosure.

The above example is only an example in which the photo-alignment pattern includes the first patterns 601 aligned along the second direction and the second patterns 602 aligned along the third direction. It can be understood that the photo-alignment device of the present disclosure can be used to form other types of photo-alignment films in one exposure process as well. For example, a photo-alignment film having a single alignment with the alignment direction being the second direction can be formed (as shown in FIG. 3), and when forming such photo-alignment film, it is not necessary to configure the second working module 520, or the light source module 200 of the second working module 520 can be turned off (as shown in FIG. 9, the light source module 200 not filled with any grid line in FIG. 9 represents the light source module 200 that is not turned on). For another example, a photo-alignment film having a single alignment with the alignment direction being the third direction can be formed (as shown in FIG. 4), and when forming such photo-alignment film, it is not necessary to configure the first working module 510, or the light source module 200 of first working module 510 can be turned off (as shown in FIG. 10, the light source module 200 not filled with any grid line in FIG. 10 represents the light source module 200 that is not turned on).

It can be understood that, in the photo-alignment device of the present disclosure, a corresponding working module 500 can be configured according to a specific situation of the photo-alignment film to be produced. In some cases, some light source modules 200, some light-polarizing modules 300 or some light-shielding modules 400 may not be adopted when forming the working module 500, as if it can meet the requirements for polarized light in the production of photo-alignment films.

Optionally, as shown in FIG. 6 to FIG. 10, the light source module 200 may include a plurality of ultraviolet light sources 201 arranged adjacently in sequence along a fourth direction D, and the fourth direction is parallel to a plane where the carrying surface 101 is located, and is not parallel to the first direction A. As an embodiment of the present disclosure, the fourth direction D is perpendicular to the first direction A. Referring to FIG. 6 to FIG. 10, the ultraviolet light sources 201 not filled with any grid line represent the ultraviolet light sources 201 that are turned off, and the ultraviolet light sources 201 filled with grid lines represent the ultraviolet light sources 201 that are turned on. After the light source module 200 is configured into a working module 500, if some regions of the working module 500 do not need polarized light, the ultraviolet light sources 201 whose orthographic projection are located in these regions can be turned off to reduce energy consumption. The ultraviolet light source 201 whose orthographic projection partially overlaps with the regions that do not need polarized light needs to be turned on to ensure that regions that require polarized light can obtain required polarized light. A light-outgoing range of the ultraviolet light source 201 can be partially shielded by the light-shielding plate 410 in the working module 500, such that the light of the ultraviolet light source 201 cannot be irradiated to the region that does not need polarized light.

Figure 11:
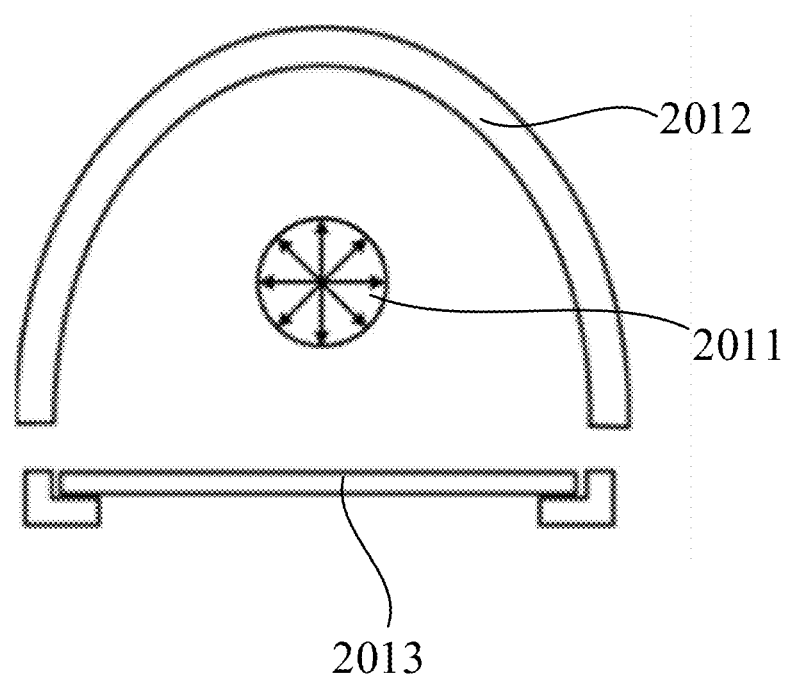
FIG. 11 is a schematic structural diagram of an ultraviolet light source according to an embodiment of the present disclosure.

In an embodiment of the present disclosure, as shown in FIG. 11, the ultraviolet light source 201 may include an ultraviolet lamp 2011, a light-reflecting mirror 2012 on a side of the ultraviolet lamp 2011, and a light-filtering sheet 2013 on a light-outgoing side of the ultraviolet light source 201. The light emitted by the ultraviolet lamp 2011 may be irradiated to the light-filtering sheet 2013, or reflected by the light-reflecting mirror 2012 and then irradiated to the light-filtering sheet 2013. The light-filtering sheet is adopted to filter light of a specific wavelength, so as to provide required ultraviolet light for the working module 500.

As an embodiment of the present disclosure, the photo-alignment device further includes a light source control circuit, and the light source control circuit is adopted to control the respective ultraviolet light sources 201 to emit light separately. In this way, the respective ultraviolet light sources 201 can be separately controlled to be turned on or off separately according to the photo-alignment pattern of the substrate 600 to be produced.

Optionally, as shown in FIG. 8, the light-shielding module 400 includes at least two light-shielding plates 410, to ensure that, in the working module 500, the light-shielding plates 410 can be respectively located on both sides of the working region of the working module 500 along the fourth direction D, to effectively limit a size of the working region in the fourth direction D. It can be understood that, in the light-shielding module 400, the more the number of the light-shielding plates 410, the greater the upper limit of the number of sub-regions, wherein the sub-regions are obtained by dividing the working region provided by the working module 500 configured with the light-shielding module 400, and the richer the types of the photo-alignment films that can be produced by the working module 500.

Optionally, as shown in FIG. 8, in the fourth direction D, the light-shielding plate 410 has two light-limiting edges 411 arranged oppositely, and the light-limiting edges 411 are arranged along the first direction A. A size of the light-limiting edge 411 in the first direction A is not smaller than a size of the light source module 200 in the first direction A. In this way, when the working region of the working module 500 is defined by the light-shielding plate 410, it can be ensured that the working region has an edge along the first direction A, which is beneficial to ensure that the working region has the same or similar size along the first direction A, at different positions along the fourth direction D, thus it is ensured that the substrate 600 has the same exposure time at different positions in the fourth direction D when the substrate 600 passes through the worktable 100, thereby ensuring uniformity of the formed photo-alignment film.

Optionally, the light-shielding plate 410 can move along the fourth direction D. A size of the light-shielding plate 410 in the fourth direction D is not smaller than a size of the ultraviolet light source 201 in the fourth direction D. In this way, when a part of light emitted by one ultraviolet light source 201 is adopted to be irradiated the working region of the working module 500, and another part of the light is not allowed to be irradiated on the substrate 600, the light that needs to be shielded can be shielded by the light-shielding plate 410, thereby realizing the purpose of adjusting an actual light-outgoing region of the ultraviolet light source 201.

As an embodiment of the present disclosure, the size of the light-shielding plate 410 in the fourth direction D is not greater than twice the size of the ultraviolet light source 201 in the fourth direction D. In this way, the light-shielding plate 410 can be made have a smaller size, which facilitates setting more light-shielding plates 410 in the light-shielding module 400. Further, as an embodiment of the present disclosure, the size of the light-shielding plate 410 in the fourth direction D is equal to the size of the ultraviolet light source 201 in the fourth direction D.

The light-shielding module 400 may further include a light-shielding support mechanism (shown as a dashed line block in FIGS. 6 and 7), and the light-shielding plate 410 can be connected to the light-shielding support mechanism and move along the fourth direction D under a control of the light-shielding support mechanism, and can realize position lock after moving to a required position. In an embodiment of the present disclosure, the light-shielding support mechanism may include a light-shielding guide rail, a plurality of light-shielding sliders, and a plurality of light-shielding locking pieces. The light-shielding sliders are set to match the light-shielding guide rail, for sliding along the fourth direction D under guidance of the light-shielding guide rail. After the light-shielding slider slides to the require position, they can be fixed on the light-shielding guide rail via the light-shielding locking pieces. The light-shielding plate 410 can be fixed on the light-shielding sliders, so as to move along with the movement of the light-shielding sliders, and realize position fix along with the light-shielding sliders fixing on the light-shielding guide rail.

In one embodiment of the present disclosure, the light-shielding module 400 and the light-polarizing module 300 can be fixedly connected to each other, to ensure a stable position relation between the light-polarizing module 300 and the light-shielding module 400. In this embodiment, the number of the light-shielding module 400 is the same as the number of the light-polarizing modules 300. For example, the light-shielding module 400 can be fixedly connected to the light-polarizing module 300, and the connection relationship between the light-shielding module 400 and the light-polarizing module 300 that are fixedly connected to each other is not adjusted when a new working module 500 is formed. In this way, the working module 500 can be formed by adding the light source module 200 with the light-shielding module 400 and the light-polarizing module 300 that are fixedly connected to each other.

In another embodiment of the present disclosure, the light-shielding module 400 may be fixedly connected to a light-outgoing side of the light source module 200, and when the light source module 200 moves, the light-shielding module 400 moves along with it. In this embodiment, the number of the light-shielding modules 400 is the same as the number of the light source modules 200.

The light-shielding module 400 can be separately fixed or separately set to be movable as well, which is not limited in the present disclosure.

The light-polarizing module 300 may include a light-polarizing sheet, such that the light passing through the light-polarizing module 300 becomes polarized light. Optionally, the light-polarizing module 300 may include a plurality of light-polarizing sheets that are arranged adjacently in sequence along the fourth direction D.

The light-polarizing module 300 may further include a light-polarizing frame for fixing the light-polarizing sheet, and the light-polarizing sheet is fixed on the light-polarizing frame to maintain its position stable, to prevent the position of the light-polarizing sheet from moving, thus reducing inaccuracy of the light-polarizing direction of the light-polarizing module 300.

The photo-alignment device provided by the present disclosure includes light-polarizing modules 300 with at least two different light-polarizing directions, for example, at least includes a first light-polarizing module 310 with a light-polarizing direction being the second light-polarizing direction and a second light-polarizing module 320 with a light-polarizing direction being the third direction. It can be understood that, when the photo-alignment film on the substrate 600 to be produced has three or more different alignment directions, in the photo-alignment device provided by the present disclosure, the light-polarizing modules 300 may include three or three light-polarizing modules 300, for example, include a first light-polarizing module 310 whose light-polarizing direction is the second direction, a second light-polarizing module 320 whose light-polarizing direction is a third direction, a third light-polarizing module whose light-polarizing direction is a fifth direction, and a fourth light-polarizing module whose light-polarizing direction is a sixth direction, etc.

Optionally, one of the second direction and the third direction may be the same as or different from the first direction A. For example, in an embodiment of the present disclosure, the first direction A is the same as the second direction, and the third direction is perpendicular to the second direction.

In some embodiments, the number of the first light-polarizing modules 310 is the same as the number of the second light-polarizing modules 320; both the number of the light source modules 200 and the number of the light-shielding modules 400 are the same as the number of the light-polarizing modules 300; and the respective light-polarizing modules 300, the respective light source modules 200 and the respective light-shielding module 400 are arranged in a one-to-one correspondence to form the respective working modules 500. In this way, the respective light-polarizing modules 300, the respective light source modules 200, and the respective light-shielding module 400 of the present disclosure have been fixedly configured into the corresponding working modules 500. When using the photo-alignment device, it is only necessary to determine which working modules 500 turn on the light source modules 200, which working modules 500 turn off the light source module 200, and adjust the position of the light-shielding plate 410 of the working modules 500 that needs to turn on the light source module 200, such that the configuration of the working module 500 can be realized.

For example, referring to FIGS. 5 to 10, in an embodiment of the present disclosure, both the number of the first light-polarizing module 310 and the second light-polarizing module 320 are one, both the number of the light source modules 200 and the number of the light-shielding modules 400 are 2. In this way, the photo-alignment device can previously form total two working modules 500, that is, the first working module 510 and the second working module 520, wherein the first working module 510 includes the first light-polarizing module 310, the light-shielding module 400 on the side of the first light-polarizing module 310 distal to the worktable 100, and the light source module 200 on the side of the light-shielding module 400 distal to the worktable 100; and the second working module 520 includes the second light-polarizing module 320, the light-shielding module 400 on the side of the second light-polarizing module 320 distal to the worktable 100, and the light source module 200 on the side of the light-shielding module 400 distal to the worktable 100.

In the first application scenario, as shown in FIG. 3, the photo-alignment film to be formed on the substrate 600 has a single alignment direction, and the alignment direction is the second direction, then as shown in FIG. 9, the light source module 200 of the first working module 510 can be turned on, and the light source module 200 of the second working module 520 is turned off. The light-shielding module 400 of the first working module 510 does not shield the light of the light source module 200, such that the working region of the first working module 510 covers the entire substrate 600 along the direction perpendicular to the first direction A. The substrate 600 is controlled to pass through the worktable 100 at a constant speed along the first direction A, such that a photo-alignment film whose alignment direction is the first direction A is formed on the surface of the substrate 600.

In the second application scenario, as shown in FIG. 4, the photo-alignment film to be formed on the substrate 600 has a single alignment direction, and the alignment direction is the third direction, then as shown in FIG. 10, the light source module 200 of the second working module 520 can be turned on, and the light source module 200 of the first working module 510 is turned off. The light-shielding module 400 of the second working module 520 does not shield the light of the light source module 200, such that the working region of the second working module 520 covers the entire substrate 600 along the direction perpendicular to the first direction A. The substrate 600 is controlled to pass through the worktable 100 at a constant speed along the first direction A, such that a photo-alignment film whose alignment direction is the second direction is formed on the surface of the substrate 600.

In the third application scenario, as shown in FIG. 2, the photo-alignment pattern of the substrate 600 includes the first patterns 601 aligned along the second direction and the second patterns 602 aligned along the third direction, then as shown in FIG. 5 to FIG. 8, both light source modules 200 need to be turned on. The position of the light-shielding plate 410 in the light-shielding module 400 of the first working module 510 is adjusted, such that the first working module 510 has the first working region, and the range of the first working region in the direction perpendicular to the first direction A is the same as the range of the first patterns 601 in the direction perpendicular to the first direction A. The position of the light-shielding plate 410 in the light-shielding module 400 of the second working module 520 is adjusted, such that the second working module 520 has the second working region, and the range of the second working region in the direction perpendicular to the first direction A is the same as the range of the second patterns 602 in the direction perpendicular to the first direction A. The substrate 600 is controlled to pass through the worktable 100 at a constant speed along the first direction A, and a photo-alignment film is formed on the surface of the substrate 600. The photo-alignment film includes at least two type of different regions, the alignment direction of one type of the two type of different regions is the second direction, and the alignment direction of the other type of the two type of different regions is the third direction, and both the two type of different regions are arranged along the direction perpendicular to the first direction A.

It can be understood that, if the light source module 200 includes a plurality of ultraviolet light sources 201, only a part of the ultraviolet light sources 201 may be turned on when the light source module 200 is turned on, if only the working module 500 can form a required working region.

The above-mentioned case where both the number of the first light-polarizing module 310 and the second light-polarizing module 320 are one is only an example. It can be understood that both the number of the first light-polarizing module 310 and the number of the second light-polarizing module 320 can be equal to other numbers as well. For example, both the number of the first light-polarizing module 310 and the number of the second light-polarizing module 320 are two, and both the number of the light source module 200 and the number of the light-shielding module 400 is four, which is not limited in the present disclosure.

Optionally, when both the number of the first light-polarizing module 310 and the number of the second light-polarizing module 320 are greater than one, both the number of the first working module 510 and the number of the second working module 520 formed by the photo-alignment device exceeds two. In this way, the substrate 600 can pass through the worktable 100 at a faster speed without reducing the exposure intensity, which will further improve the speed for producing the photo-alignment film. Not only that, it is further possible to adjust the exposure intensity at different positions on the substrate 600 under the condition that the moving speed of the substrate 600 is constant by adjusting the number that the first working module 510 and the second working module 520 are turned on, so as to further improve capability that the photo-alignment device produces more complex photo-alignment films.

In other embodiments, the number of light source modules 200 is less than the number of light-polarizing modules 300, and the number of light-shielding modules 400 is not less than the number of light source modules 200. The light source modules 200 can be moved along the first direction A, so as to get along with different light-polarizing modules 300 to form different working modules 500. Further, the photo-alignment device may further include a light source guide rail, and the respective light source modules 200 can cooperate with the light source guide rail, and move along the first direction A under the guidance of the light source guide rail, and after moving to a required position, be fixed on the light source guide rail via a fastener.

In the above way, the required working module 500 can be formed by moving the light source module 200 above the required light-polarizing module 300 according to the structural characteristics of the photo-alignment film to be produced. This enables the photo-alignment device to adopt a smaller number of light source modules 200 to obtain more combination of working modules 500, such that the photo-alignment device can be applied to the production of more types of photo-alignment films.

In an embodiment of the present disclosure, the number of the first light-polarizing modules 310 is at least two, for example, N (N is a natural number greater than 1); the number of the second light-polarizing modules 320 is the same as that of the first light-polarizing modules; and the number of the light source modules 200 is the same as the number of the first light-polarizing modules 310, which is N.

By moving the light source module 200 to combine with different light-polarizing modules 300 to form a working module 500, the photo-alignment device can at least form the following combinations of the working modules 500: N first working modules 510 and 0 second working modules 520, N−1 first working modules 510 and 1 second working module 520, . . . , 0 first working modules 510 and N second working modules 520. The number of the first working modules 510 and the number of the second working module

520 are different, and the exposure intensity of the first patterns 601 and the exposure intensity of the second patterns 602 of the substrate 600 can be adjusted.

Exemplarily, the number of the first light-polarizing modules 310 is two, the number of the second light-polarizing modules 320 is two, and the number of the light source modules 200 is two. The photo-alignment device can be configured into the following different states for producing different photo-alignment films:

The first state: 2 first working modules 510, no second working module 520, The second state: one first working module 510 and one second working module 520, The third state: there is no first working module 510 and there is two second working modules 520.

In another embodiment of the present disclosure, the number of the first light-polarizing modules 310 is 2M (M is a natural number), the number of the second light-polarizing modules 320 is M, and the number of light source modules 200 is 2M, which is the same as that of the first light-polarizing module 200.

In this way, by moving the light source module 200 to combine with different light-polarizing modules 300 to form different working modules 500, the photo-alignment device can be configured as at least any one of the following working modules 500: 2M first working modules 510 and 0 second working module 520, 2M–1 first working modules 510 and 1 second working module 520, . . . , M first working modules 510 and M second working modules 520. The exposure intensity of the first patterns 601 and the exposure intensity of the second patterns 602 of the substrate 600 can be adjusted due to difference between the number of the first working modules 510 and the number of the second working modules 520.

Figure 12:
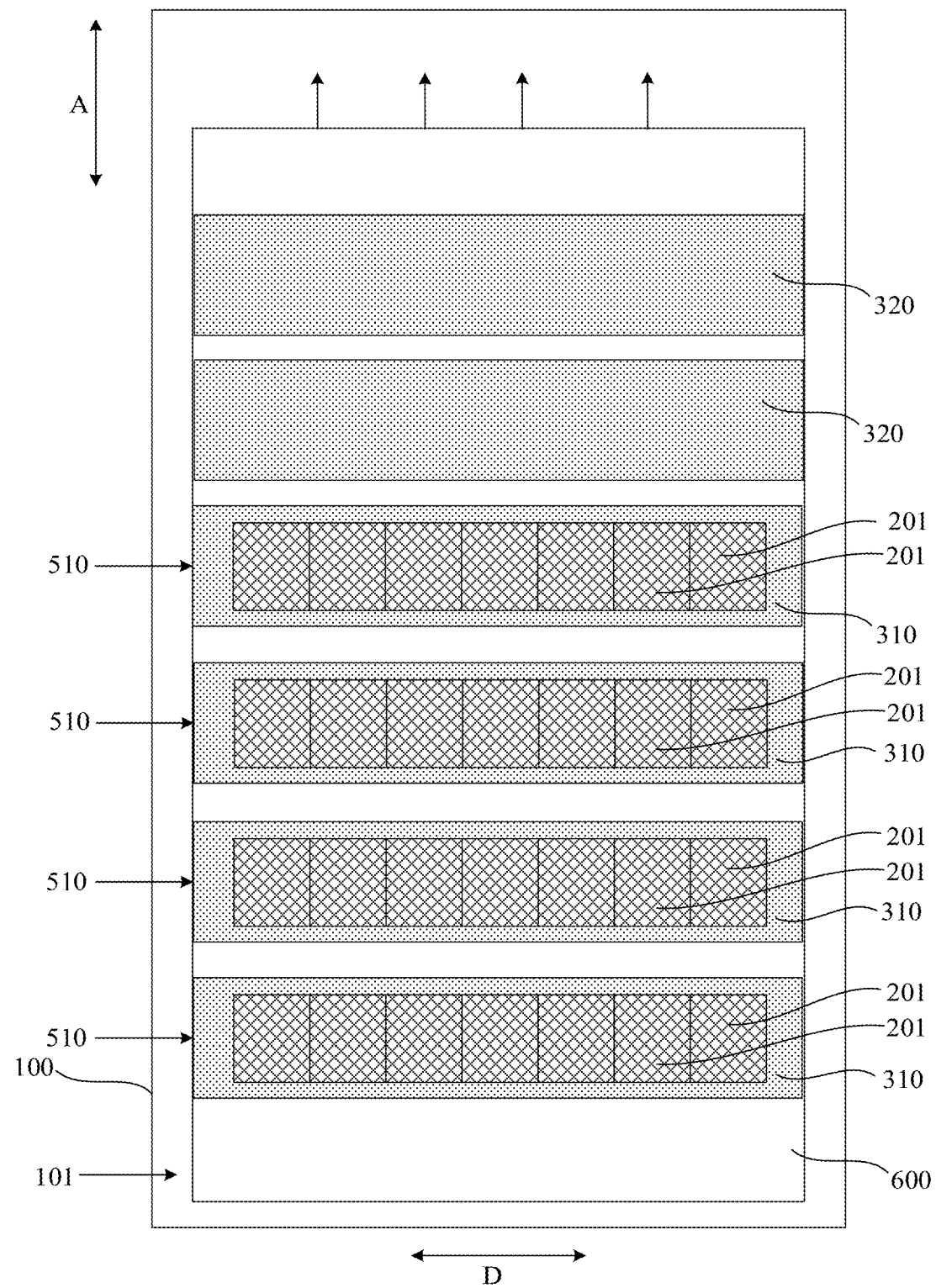
FIG. 12 is a schematic structural diagram of a top view of a configuration state of a photo-alignment device in according to an embodiment of the present disclosure.

Exemplarily, as shown in FIG. 11 to FIG. 15, the number of the first light-polarizing modules 310 is four, the number of the second light-polarizing modules 320 is two, and the number of the light source modules 200 is four. The photo-alignment device can be configured into the following different states for producing different photo-alignment films:

The first state: as shown in FIG. 12, there are four first working modules 510 and no second working module 520.

Figure 13:
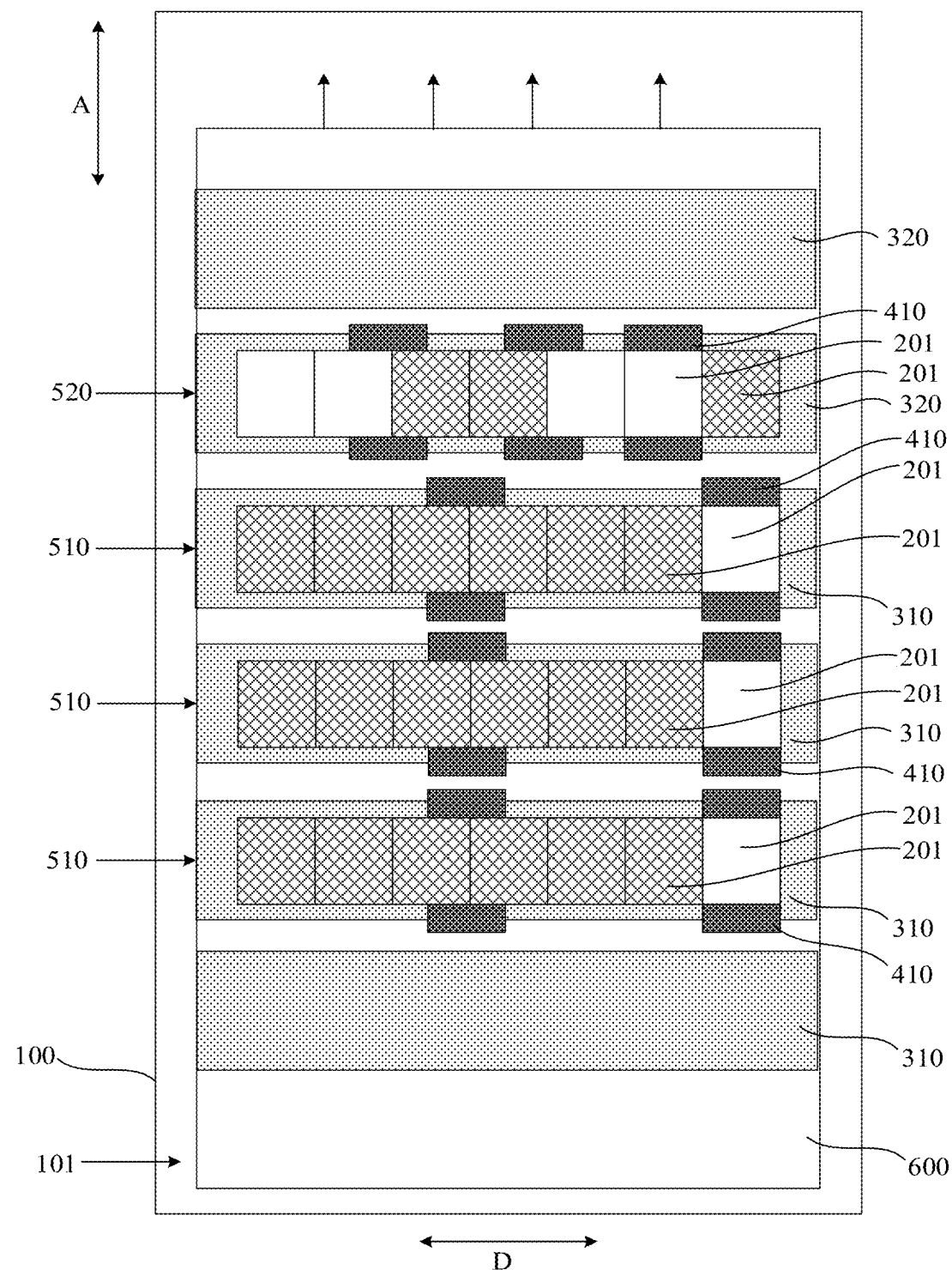
FIG. 13 is a schematic structural diagram of a top view of a configuration state of a photo-alignment device in according to an embodiment of the present disclosure.

The second state: as shown in FIG. 13, three first working modules 510 and one second working module 520.

Figure 14:
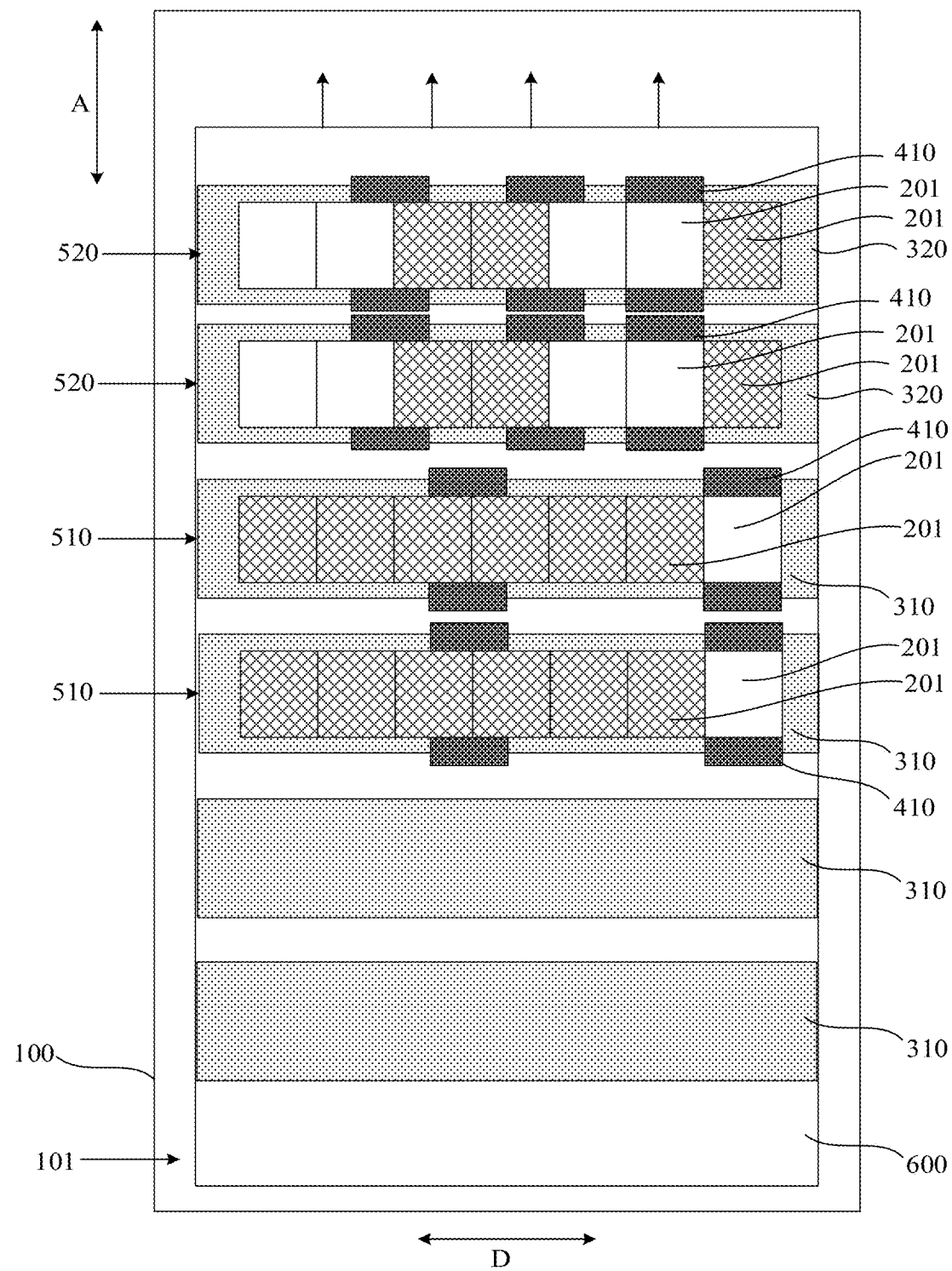
FIG. 14 is a schematic structural diagram of a top view of a configuration state of a photo-alignment device in according to an embodiment of the present disclosure.

The third state: as shown in FIG. 14, there are two first working modules 510 and two second working modules 520.

Figure 15:
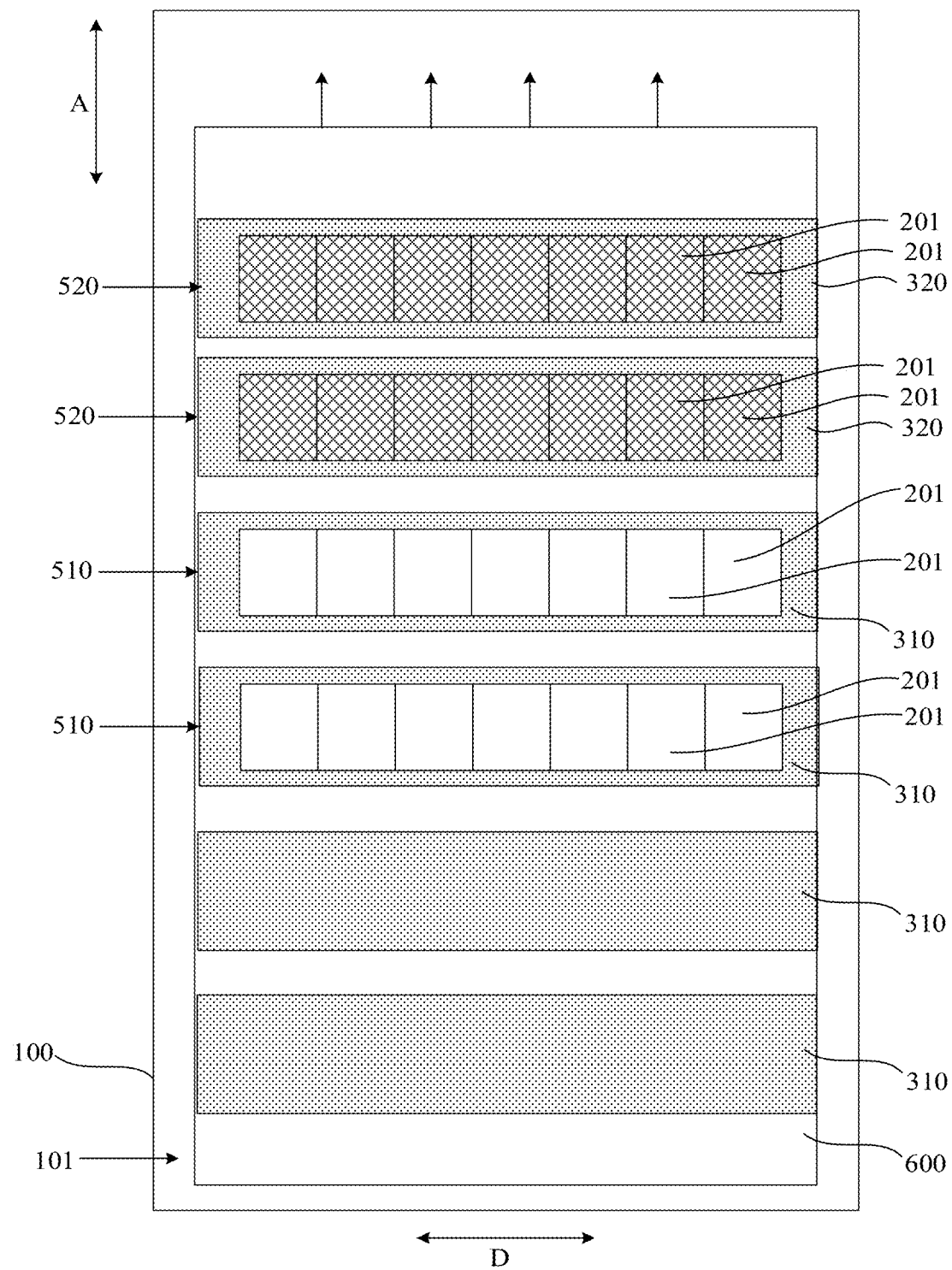
FIG. 15 is a schematic structural diagram of a top view of a configuration state of a photo-alignment device in according to an embodiment of the present disclosure.

The fourth state: as shown in FIG. 15, there are two first working modules 510 and two second working modules 520, and the light source module 200 of the first working module 510 is turned off.

It should be understood that the present disclosure does not limit its application to the detailed structure and arrangement of components set forth in this specification. The present disclosure is capable of other embodiments and of being implemented and carried out in various ways. The foregoing variations and modifications fall within the scope of the present disclosure. It will be understood that the present disclosure disclosed and defined in this specification extends to all alternative combinations of two or more of the individual features mentioned or evident in the text and/or drawings. All of these different combinations constitute various alternative aspects of the present disclosure. The embodiments of this specification illustrate the best mode known for carrying out the disclosure, and will enable those skilled in the art to utilize the disclosure.

Figure 16:
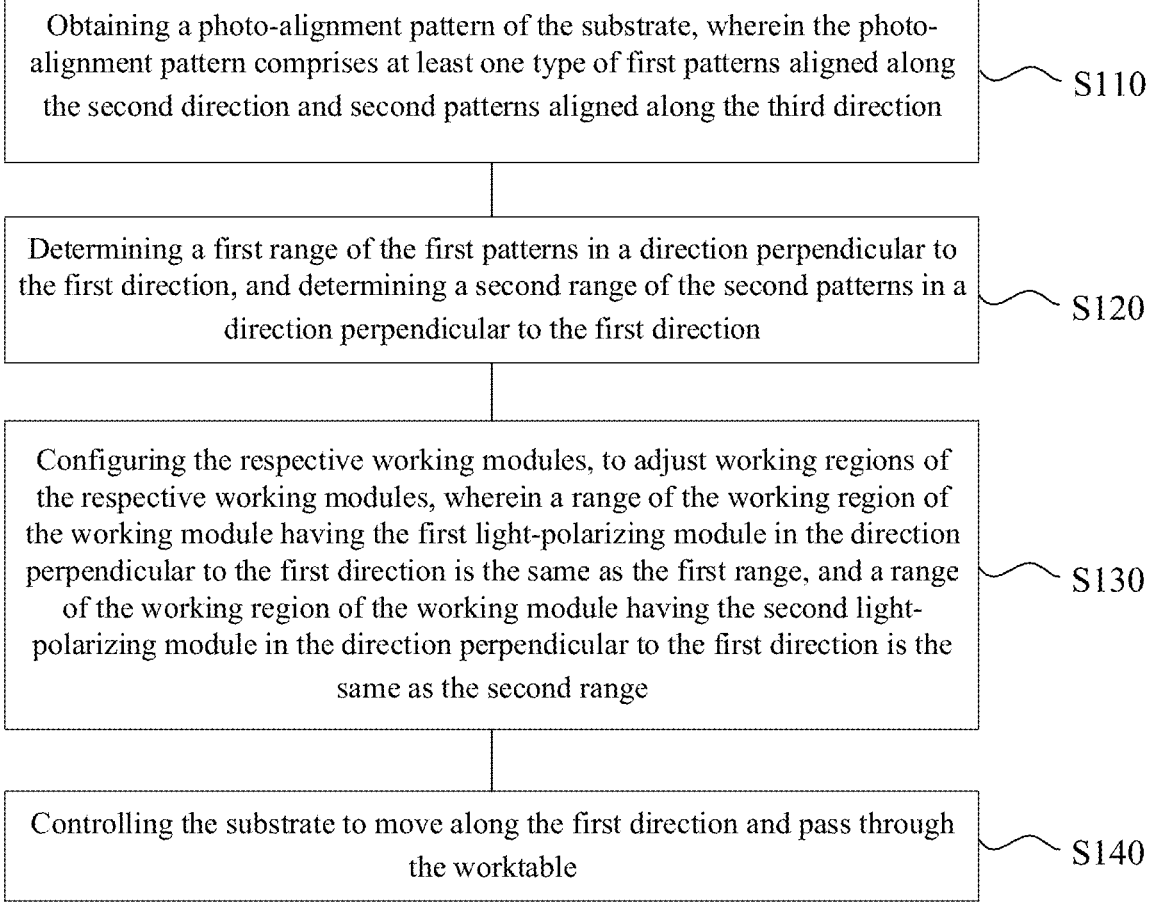
FIG. 16 is a schematic flowchart of a photo-alignment method according to an embodiment of the present disclosure.

The present disclosure further provides a photo-alignment method, to form a photo-alignment film on the substrate 600. The photo-alignment method is applied to any photo-alignment device described in the above-mentioned embodiments of the photo-alignment device. As shown in FIG. 16, the photo-alignment method includes:

step S110, obtaining a photo-alignment pattern of the substrate 600, wherein the photo-alignment pattern includes at least one type of the first patterns 601 aligned along the second direction and the second patterns 602 aligned along the third direction;

Step S120, determining a first range of the first patterns 601 in the direction perpendicular to the first direction A, and determining a second range of the second patterns 602 in the direction perpendicular to the first direction A;

step S130, configuring the respective working modules 500 to adjust the working regions of the respective working modules 500, wherein the working region of the working module 500 is a region of the polarized light that the working module 500 irradiates onto the worktable 100, wherein the range of the working region of the working module 500 having the first light-polarizing module 310 in the direction perpendicular to the first direction A is the same as the first range, and the range of the working region of the working module 500 having the second light-polarizing module 320 in the direction perpendicular to the first direction A is the same as the second range; and step S140, controlling the substrate 600 to move along the first direction A and pass through the worktable 100.

The photo-alignment method can be applied to any photo-alignment device described in the above-mentioned embodiments of the photo-alignment device. The principle, details and effects of the photo-alignment method are described in detail in the above-mentioned embodiments of the photo-alignment device. The present disclosure is not repeated here.

It should be noted that although the various steps of the methods of the present disclosure are described in a specific order in the drawings, this does not require or imply that the steps must be performed in this specific order, or that all of the steps shown must be performed in order to realize the desired result. Additionally or alternatively, certain steps may be omitted, a plurality of steps may be combined into one step for execution, and/or one step may be decomposed into a plurality of steps for execution, etc., all of which should be considered as a part of the present disclosure.

What is claimed is:

1. A photo-alignment device, comprising:
    a worktable having a carrying surface for carrying a substrate;
    at least two light source modules arranged along a first direction;
    at least two light-polarizing modules arranged along the first direction, wherein the light-polarizing modules at least comprises a first light-polarizing module and a second light-polarizing module, and a light-polarizing direction of the first light-polarizing module is different from a light-polarizing direction of the second light-polarizing module; and
    at least two light-shielding modules arranged along the first direction, wherein any one of the light-shielding modules comprise at least two light-shielding plates that are movable, wherein:
    the light source modules, the light-polarizing modules, and the light-shielding modules are able to form a plurality of working modules, any one of the working modules comprises one of the light-polarizing modules, one of the light source modules, and one of the light-shielding module, the light source module is arranged on a side of the light-polarizing module distal to the worktable, the light-shielding module is able to be configured to shield at most a part of light emitted by the light source module, and in a state where the light-shielding plate does not shield the light of the light source module, the light emitted by the light source module is able to pass through the light-polarizing module to form polarized light to be irradiated to the worktable;

the substrate is configured with a photo-alignment pattern, wherein the photo-alignment pattern comprises at least one type of first patterns aligned along the light-polarizing direction of the first light-polarizing module and second patterns aligned along the light-polarizing direction of the second light-polarizing module; and the respective working modules are configured as: a position of a working region of the working module having the first light-polarizing module is the same as a position of the first patterns in a direction perpendicular to the first direction, and a position of a working region of the working module having the second light-polarizing module is the same as a position of the second patterns in the direction perpendicular to the first direction, wherein the working region of the working module is a region of the polarized light that the working module irradiates onto the worktable.

2. The photo-alignment device according to claim 1, wherein the light source module comprises: a plurality of ultraviolet light sources, arranged adjacently in sequence along a fourth direction, wherein the fourth direction is parallel to a plane where the carrying surface is located, and is not parallel to the first direction.

3. The photo-alignment device according to claim 2, wherein the photo-alignment device comprises a light source control circuit for controlling the respective ultraviolet light sources to emit light separately.

4. The photo-alignment device according to claim 2, wherein the light-shielding plate is able to move along the fourth direction, a size of the light-shielding plate in the fourth direction is not smaller than a size of the ultraviolet light source in the fourth direction.

5. The photo-alignment device according to claim 2, wherein, in the fourth direction, the light-shielding plate has two light-limiting edges arranged oppositely, the light-limiting edge is arranged along the first direction, and a size of the light-limiting edge in the first direction is not smaller than a size of the light source module in the first direction.

6. The photo-alignment device according to claim 1, wherein a number of the first light-polarizing modules is the same as a number of the second light-polarizing modules, both a number of the light source modules and a number of the light-shielding modules are the same as the number of the light-polarizing modules, and the respective light-polarizing modules, the respective light source modules and the respective light-shielding modules are arranged in a one-to-one correspondence to form the respective working modules.

7. The photo-alignment device according to claim 1, wherein a number of the light source modules is less than a number of the light-polarizing modules, and a number of the light-shielding modules is not less than the number of the light source modules, and the light source module is able to move along the first direction, to get along with different ones of the light-polarizing modules to form different ones of the working modules.

8. The photo-alignment device according to claim 7, wherein a number of the first light-polarizing modules is at least two, and a number of the second light-polarizing modules is the same as the number of the first light-polarizing modules, and the number of the light source modules is the same as the number of the first light-polarizing modules.

9. The photo-alignment device according to claim 7, wherein a number of the first light-polarizing modules is twice a number of the second light-polarizing modules, and the number of the light source modules is the same as the number of the first light-polarizing modules.

10. A photo-alignment method, the comprising:
providing a photo-alignment device, wherein the photo-alignment device comprises:
a worktable having a carrying surface for carrying a substrate; at least two light source modules, arranged along a first direction; at least two light-polarizing modules, arranged along the first direction, wherein the light-polarizing modules at least comprises a first light-polarizing module and a second light-polarizing module, and a light-polarizing direction of the first light-polarizing module is different from a light-polarizing direction of the second light-polarizing module; and at least two light-shielding modules, arranged along the first direction, wherein any one of the light-shielding modules comprise at least two light-shielding plates that are movable, wherein the light source modules, the light-polarizing modules and the light-shielding modules are able to form a plurality of working modules, any one of the working modules comprises one of the light-polarizing modules, one of the light source modules and one of the light-shielding module, the light source module is arranged on a side of the light-polarizing module distal to the worktable, the light-shielding module is able to be configured to shield at most a part of light emitted by the light source module, and in a state where the light-shielding plate does not shield the light of the light source module, the light emitted by the light source module is able to pass through the light-polarizing module to form polarized light to be irradiated to the worktable;

obtaining a photo-alignment pattern of the substrate, wherein the photo-alignment pattern comprises at least one type of first patterns aligned along the light-polarizing direction of the first light-polarizing module and second patterns aligned along the light-polarizing direction of the second light-polarizing module;

determining a position of the first patterns in a direction perpendicular to the first direction, and determining a position of the second patterns in a direction perpendicular to the first direction;

configuring the respective working modules, to adjust working regions of the respective working modules, wherein the working region of the working module is a region of the polarized light that the working module irradiates onto the worktable, wherein a position of the working region of the working module having the first light-polarizing module in the direction perpendicular to the first direction is the same as the position of the first patterns, and a position of the working region of the working module having the second light-polarizing module in the direction perpendicular to the first direction is the same as the position of the second patterns; and controlling the substrate to move along the first direction and pass through the worktable.

11. The photo-alignment method according to claim 10, wherein the light source module comprises: a plurality of ultraviolet light sources arranged adjacently in sequence along a fourth direction, wherein the fourth direction is parallel to a plane where the carrying surface is located, and is not parallel to the first direction.

12. The photo-alignment method according to claim 11, wherein the photo-alignment device comprises a light source control circuit for controlling the respective ultraviolet light sources to emit light separately.

13. The photo-alignment method according to claim 11, wherein the light-shielding plate is able to move along the fourth direction, a size of the light-shielding plate in the fourth direction is not smaller than a size of the ultraviolet light source in the fourth direction.

14. The photo-alignment method according to claim 11, wherein, in the fourth direction, the light-shielding plate has two light-limiting edges arranged oppositely, the light-limiting edge is arranged along the first direction, and a size of the light-limiting edge in the first direction is not smaller than a size of the light source module in the first direction.

15. The photo-alignment method according to claim 10, wherein:

a number of the first light-polarizing modules is the same as a number of the second light-polarizing modules, both a number of the light source modules and a number of the light-shielding modules are the same as the number of the light-polarizing modules, and the respective light-polarizing modules, the respective light source modules and the respective light-shielding modules are arranged in a one-to-one correspondence to form the respective working modules.

16. The photo-alignment method according to claim 10, wherein:

a number of the light source modules is less than a number of the light-polarizing modules, and a number of the light-shielding modules is not less than the number of the light source modules, and the light source module is able to move along the first direction, to get along with different ones of the light-polarizing modules to form different ones of the working modules.

17. The photo-alignment method according to claim 16, wherein:

a number of the first light-polarizing modules is at least two, and a number of the second light-polarizing modules is the same as the number of the first light-polarizing modules, and the number of the light source modules is the same as the number of the first light-polarizing modules.

18. The photo-alignment method according to claim 16, wherein a number of the first light-polarizing modules is twice a number of the second light-polarizing modules, and the number of the light source modules is the same as the number of the first light-polarizing modules.

* * * * *